(12) United States Patent
Pajot

(10) Patent No.: US 6,464,304 B1
(45) Date of Patent: Oct. 15, 2002

(54) WHEEL RIM FLANGE CROWN

(75) Inventor: Joseph J. Pajot, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/571,445

(22) Filed: May 16, 2000

(51) Int. Cl.[7] .......................... B60B 25/00; B60C 17/00
(52) U.S. Cl. .......................... 301/95.101; 301/10.1; 152/516; 152/520
(58) Field of Search .................. 152/516, 520, 152/381.4, 379.4; 301/95.101, 95.107, 95.108, 10.1

(56) References Cited

U.S. PATENT DOCUMENTS

| | | | |
|---|---|---|---|
| 1,219,922 A | 3/1917 | Fischer | |
| 1,489,434 A | 4/1924 | Harvey | |
| 2,043,931 A | 6/1936 | Morgan | 177/311 |
| 2,305,771 A | 12/1942 | Grupp | 265/1 |
| 2,371,784 A | 3/1945 | Titcomb | 61/78 |
| 2,934,940 A | 5/1960 | Beissbarth | 73/11 |
| 3,027,553 A | 3/1962 | Sandor | 340/269 |
| 3,517,550 A | 6/1970 | Leventhal | 73/88.5 |
| 3,871,709 A | 3/1975 | Eaton | 301/63 |
| 4,059,138 A * | 11/1977 | Mirtain et al. | 152/520 |
| 4,117,719 A | 10/1978 | Schutz | 73/141 |
| 4,212,338 A * | 7/1980 | Tiemann | 152/520 |
| 4,275,932 A | 6/1981 | Baird | 301/39 |
| 4,281,701 A * | 8/1981 | Ross | 152/520 |
| 4,838,616 A * | 6/1989 | Koch | 301/10.1 |
| 4,900,095 A * | 2/1990 | Brubaker | 301/10.1 |
| 5,056,630 A * | 10/1991 | Fujii et al. | 301/95.101 |
| 5,133,211 A | 7/1992 | Brown | 72/118.1 |
| 5,186,042 A | 2/1993 | Miyazaki | 73/118.1 |
| 5,193,386 A | 3/1993 | Hesse, Jr. | 73/117 |
| 5,503,030 A | 4/1996 | Bankestrom | 73/862.627 |
| 5,540,108 A | 7/1996 | Cook | 73/862.041 |
| 6,086,161 A * | 7/2000 | Luttgeharm et al. | 301/95.101 |
| 6,138,730 A * | 10/2000 | Fotij et al. | 301/95.107 |
| 6,276,416 B1 * | 8/2001 | Iwamura | 152/516 |

FOREIGN PATENT DOCUMENTS

| | | | |
|---|---|---|---|
| EP | 480 358 A1 | 4/1992 | F16D/55/40 |
| FR | 2 534 193 A | 4/1984 | |
| GB | 878 973 A | 10/1961 | 144/103 |

* cited by examiner

Primary Examiner—S. Joseph Morano
Assistant Examiner—Long Bao Nguyen
(74) Attorney, Agent, or Firm—Larry J. Palguta

(57) ABSTRACT

A wheel (11) having a rim (12) with a pair of flanges (17, 19) including a peripheral potential roll surface (33) on at least one flange for contacting the ground in the event of tire failure has a convexly contoured roll surface with a finite cross-sectional radius of curvature (42) at the outermost radius of the wheel to provide an optimized shape of the contact surface and an enhanced contact area without introducing any flat regions in the contact area. The roll surface is formed to have a finite radius of curvature throughout the potential roll surface. The roll surface radius of curvature and may be formed in cross-section as a central circular segment (40) blending smoothly into two circular segments (44, 50) of lesser radii at the central circular segment extremities, or may be formed in cross-section as a portion of an ellipse (57) having a semi-minor axis (63) extending generally radially along the respective annular rim portion.

13 Claims, 4 Drawing Sheets

WHEEL RIM FLANGE CROWN

BACKGROUND OF THE INVENTION

1. Field of the Invention

The present invention relates generally to vehicle wheels having a rim for supporting an pneumatic tire and more particularly to an improved rim configuration for reducing rim failure in the event of tire failure.

2. Description of the Related Art

When a vehicle tire fails during vehicle operation, the tire is sometimes destroyed and the vehicle may continue to move on the rolling rim. It is important in such cases that rim integrity be maintained until the vehicle is brought safely to a stop. Aircraft wheels are required by FAA TSO-C26c to pass a roll-on-rim test as part of their qualification. This test consists of rolling a wheel without a tire at a specified speed and load for a specified minimum distance without fragmentation of the wheel. In practice, this has proven to be a difficult test to pass, partly due to the intensity of the cyclic stresses in the area where the rim flange is in contact with the dynamometer or runway. The local stresses in the contact area can be reduced by decreasing the flange load. The total applied load and the axle/wheel stiffness distribution generally control the flange load. In the case of a cantilever mounted wheel, the inboard flange typically carries a greater share of the total applied load than does the outboard flange due to axle deflection. This load share can be altered, within limits, by the use of differential flange heights, that is, some combination of a decreased inboard flange height and/or increased outboard flange height. This technique is described in Baird et al U.S. Pat. 4,275,932 entitled NON-FRANGIBLE WHEEL and is frequently used. The Tire and Rim Association has established standards for rim geometry and limits on the extent to which rim flange heights may be altered. Consequently, there is a limit to the amount of load that can be redistributed from the inboard flange to the outboard flange.

The Baird et al patent also suggests increasing the section modulus of the rim by increasing the flange width and providing a wider flat contact surface. Gross changes in flange geometry, which result in an increase in the section modulus (e.g., increased flange width), have a relatively small effect on local stresses. Increased flange width also undesirably adds to wheel weight.

SUMMARY OF THE INVENTION

The present invention recognizes that the shape of the flange at the point of contact has a more significant effect on the local stresses. For a given amount of flange load, the rim flange geometry can be optimized to reduce the local stresses in the flange.

The present invention provides solutions to the above problems by providing a roll surface for contacting the ground in the absence of, or upon failure of, a tire which avoids flat surfaces and corners and includes a generous radius of curvature, or crown, at the point of contact between the rim and ground, or test dynamometer, which greatly reduces the local stresses in the area of contact. This curvature may be produced as simple radius, compound radius, elliptical shape, or other smooth curve. This local curvature can be optimized in terms of radius of curvature and location of contact to minimize the local stresses and maximize the number of cycles to failure. This feature can be applied to either inboard or outboard wheel flanges and may be used in tandem with differential flange heights.

The invention comprises, in one form thereof, a wheel having an annular rim portion of generally U-shaped cross-sectional configuration for receiving a tire and including a rim peripheral extremity functioning as a potential roll surface for contacting the ground in the event of tire failure. The extremity has a convex annular surface formed in cross-section as a smooth curve having a radius of curvature which is finite throughout. The annular surface may be formed in cross-section as a portion of an ellipse having a semi-minor axis extending generally radially along the annular rim portion. The annular surface may be formed in cross-section as a central circular segment blending smoothly into two circular segments of lesser radii at the central circular segment extremities.

An advantage of the present invention is that by reducing the intensity of the local rim flange stresses in the contact area, the test roll distance is increased and the likelihood of tire failure induced rim failure is lowered without increasing wheel weight.

BRIEF DESCRIPTION OF THE DRAWINGS

Like reference numerals indicate like parts throughout the several drawing views.

DETAILED DESCRIPTION OF THE INVENTION

Figure 1:
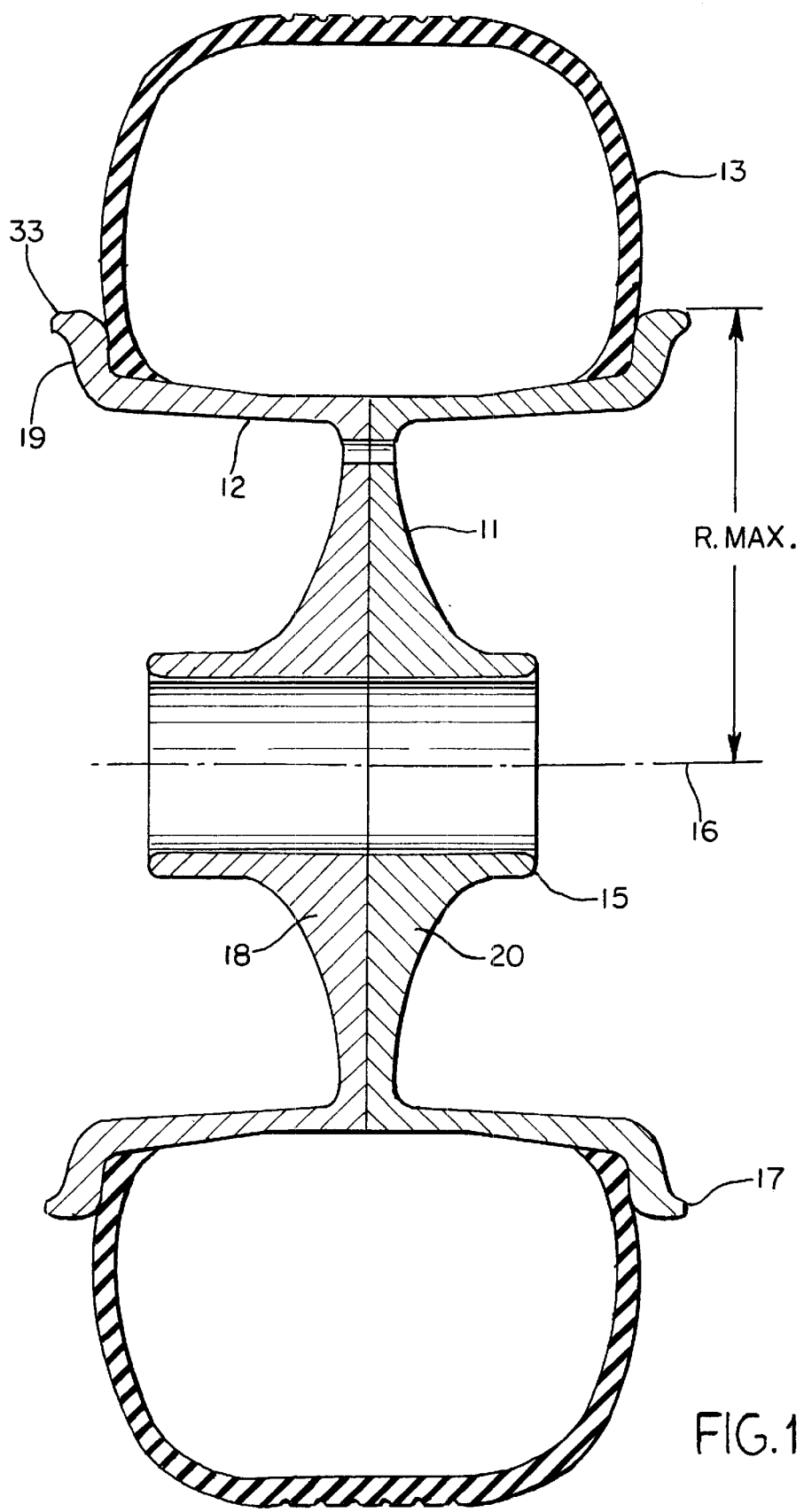
FIG. 1 is a view in cross-section of a wheel and mounted tire incorporating improved rim flange geometry according to the invention in one form.
Figure 2:
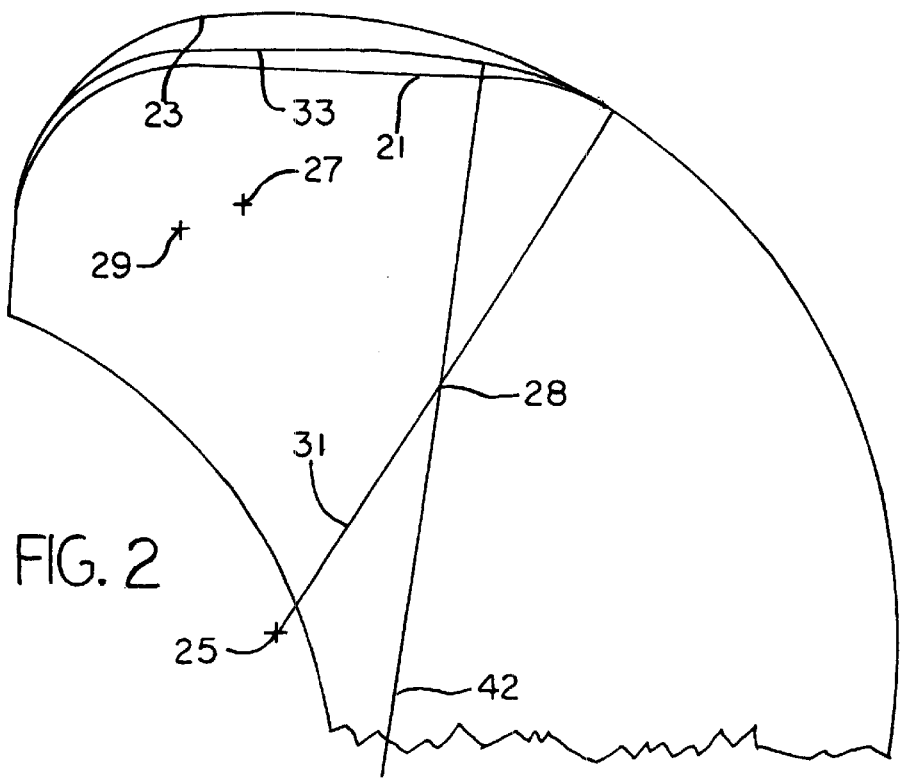
FIG. 2 is an enlarged section view of the rim flange geometry of FIG. 1.

Referring now to the drawings and particularly to FIG. 1, there is shown an illustrative aircraft wheel 11 having an annular rim portion 12 of generally U-shaped cross-sectional configuration for receiving a pneumatic tire 13. The wheel has a central hub portion 15 adapted to be journaled to an axle (not shown) for rotation about the axis 16. The rim portion 12 of the wheel 11 which mates with the tire 13 has radially outwardly extending flanges such as 17 and 19 extending to the radially outermost extent of the wheel. In the absence of a tire or in the event of catastrophic tire failure, this flange region assumes the vehicle support responsibility. The wheel 11 may be cast or forged as a pair of matable wheel halves such as 18 and 20 from an aluminum alloy so that each half includes one of the radially outermost peripheral rim portions 17 or 19. The two halves are typically not identical and are joined by bolts or other technique to form a complete wheel. Subsequent machining may include forming each of the peripheral portions such as 33 to have a finite radius of curvature throughout. This convex region forms a potential roll surface in the event of tire failure. The greatest radius of the peripheral rim portion 17 is indicated by R max. The two rim portion radii may be made to differ to more evenly distribute a load between the two rim portions in the event of tire failure as suggested earlier. The crowned rim contour of a flange such as 19 is shown in greater detail in FIG. 2.

Figure 6:
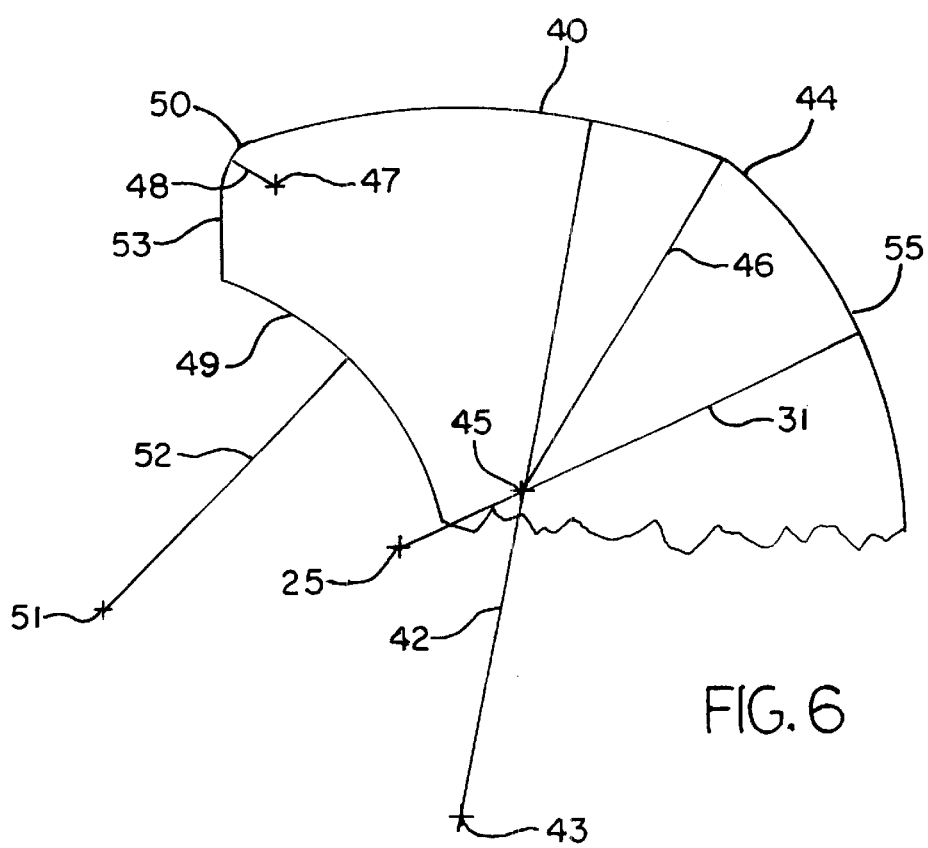
FIG. 6 is an enlarged section view showing one technique for generating the rim crown of FIGS. 1 and 2.

The Tire and Rim Association standards mentioned earlier limit the cross-sectional flange contour at a minimum rim diameter by the curve 21 and at a maximum rim diameter by the curve 23. According to the standards, rim contours should lie intermediate these two curves. The curve 23 is generated by a 90 degree arc centered at 25 coupled by a straight line portion (forming the peripherally outermost surface of the maximal rim) to another approximately 90 degree arcuate segment centered at 27. The curve 21 is formed by lesser radii arcuate portions centered at 29 and 28 joined by a straight line portion forming the outermost surface of the minimal rim. Comparing FIGS. 2 and 6, the rim contour 33 of the present invention is a domed or convex annular surface region avoiding the flat portions of contours 21 and 23. The extremity is preferably formed in cross-section as a smooth curve having a radius of curvature which is finite throughout. For example, contour 33 may be formed as a central large radius arc formed in cross-section as a central circular segment 40 of radius 42 blending smoothly into two circular segments 44 and 50 of lesser radii 46 and 48 respectively at the central circular segment 40 extremities as shown in FIG. 6. At the other lesser radii arc ends, the rim contour is blended smoothly into the arc of radius 31 centered at 25 and the other end, into the standard rim contour. In one exemplary embodiment, R max was slightly under 12 inches, radius 42 was about 3 inches while radius 31 was about 1 inch, radius 46 was about 0.5 inches and radius 48 was about 0.2 inches.

Figure 3:
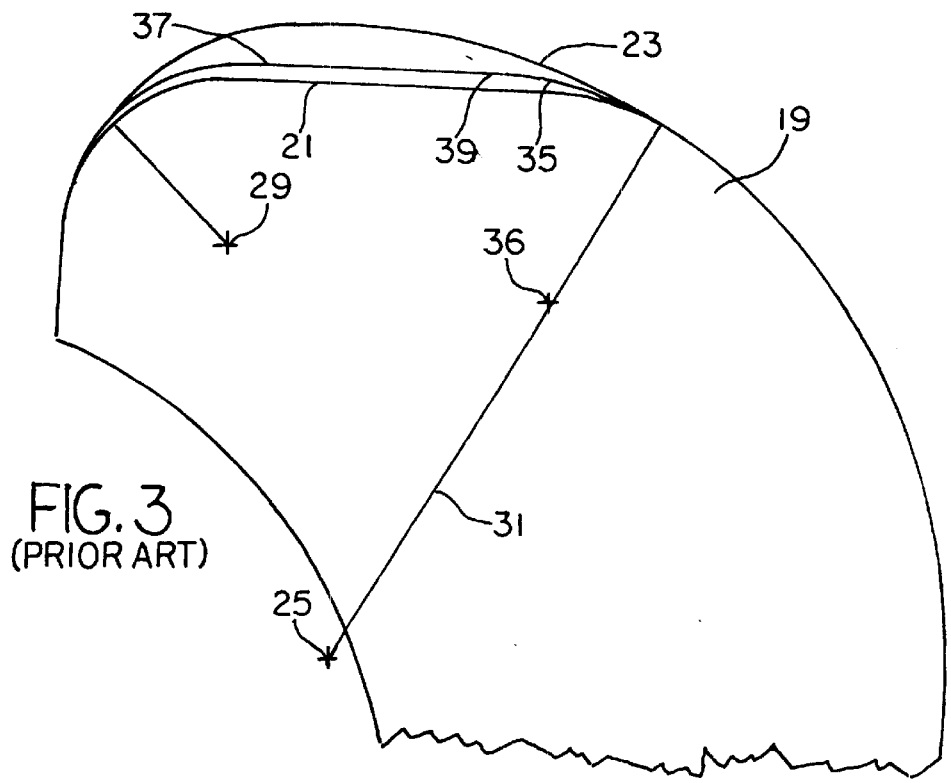
FIG. 3 is an enlarged section view showing the rim flange geometry of a prior art wheel rim flange.
Figure 4:
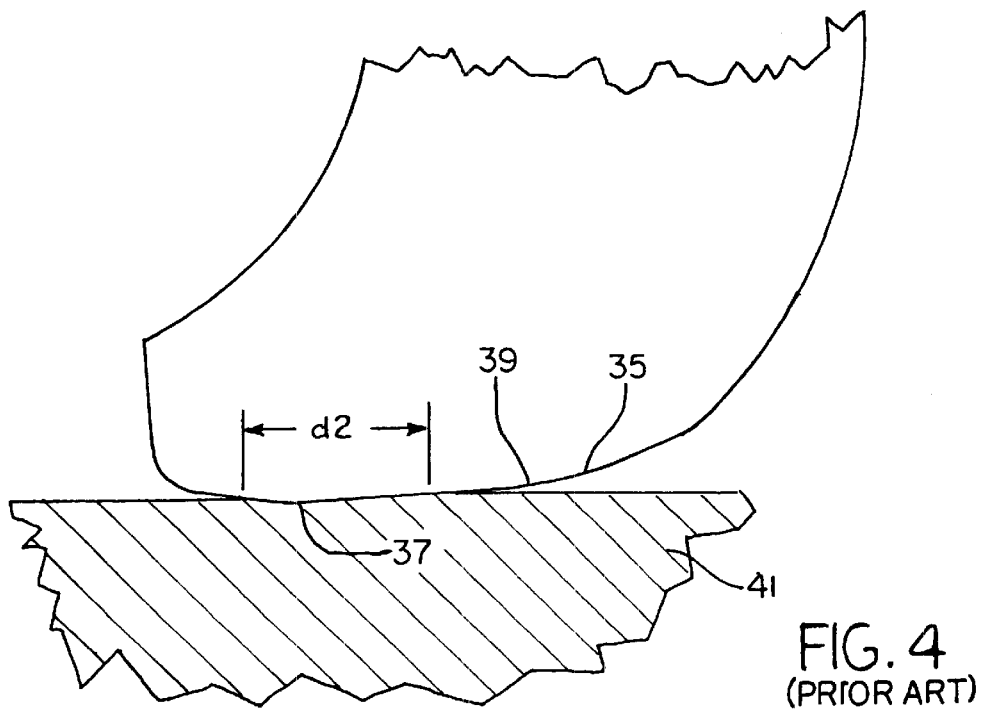
FIG. 4 illustrates contact between the wheel rim flange of FIG. 3 and a support surface.

In FIG. 3, a typical prior art cross-sectional flange contour 35 is shown intermediate the Tire and Rim Association standards curves 21 and 23. Like those standard curves, contour 35 includes a straight segment from point 37 to point 39 tangentially connecting with two arcuate segments, one centered at 36, and the other, a portion of the standard rim contour centered at 29. FIG. 4 illustrates this contour contacting a support surface such as a runway.

Figure 5:
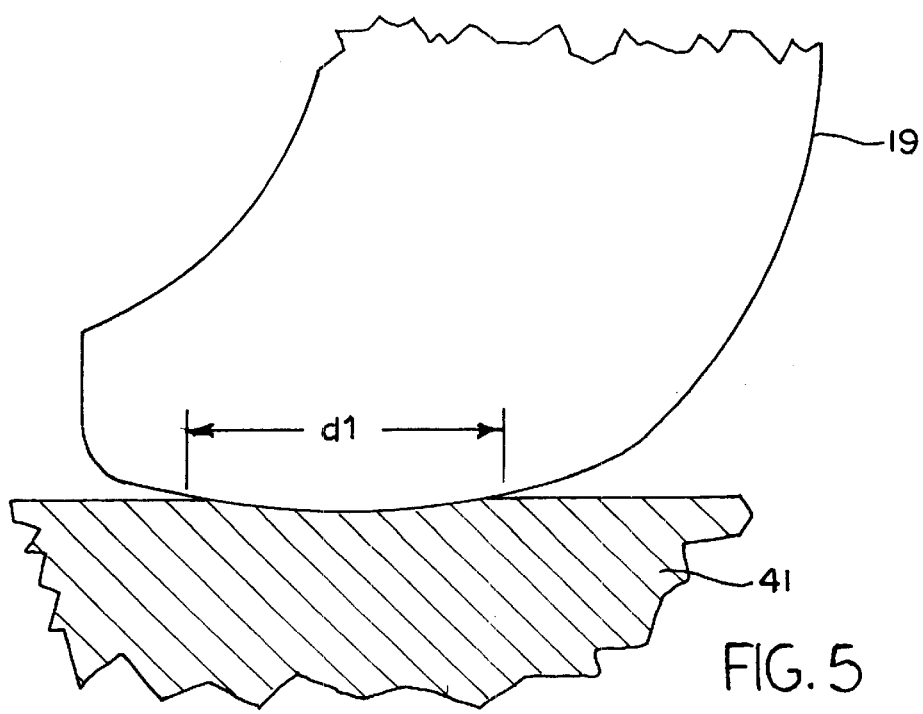
FIG. 5 illustrates contact between the wheel rim flange of FIG. 2 and a support surface.

A flat runway and a flat annular surface on the peripherally outermost portion of the rim would seem well suited to supporting the vehicle in the event of tire failure, however, the two flat surfaces are almost never exactly parallel, nor are runway surfaces truly flat. Both the wheel and the support surface deform somewhat when supporting the weight of a large aircraft. Moreover, various materials are used for support surfaces such as runways and surface conditions vary. Asphalt, for example, deforms under load by varying amounts depending on conditions such as temperature. The result may be contact of the prior art wheel with the surface of runway 41 as illustrated in FIG. 4. The width of the contact area is shown by d2. Of course, the relative wheel-runway misalignment might be reversed with tangent point 39 rather than 37 engaging the surface. By contrast, when the rim outermost surface is formed with the domed contour of FIGS. 1 and 2, the width of the contact area as shown by dl in FIG. 5, is increased despite surface imperfections and variations thereby reducing the loading stresses on the rim and improving tire failure roll distance. This convex surface comprises the potential roll surface for contacting the ground in the event of tire failure.

Figure 7:
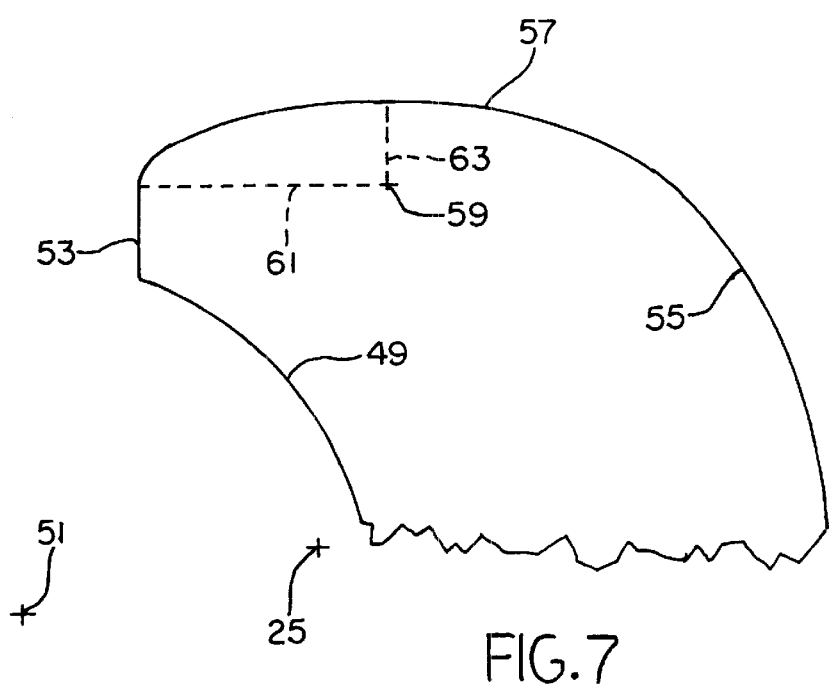
FIG. 7 is an enlarged section view showing an alternate technique for generating the rim crown of FIGS. 1 and 2.

FIGS. 6 and 7 illustrate ways in which the domed wheel rim flange region may be formed. In FIG. 6, the rim contour is formed as an arcuate segment of a circle centered at 43 tangentially blending into a lesser radius arcuate segment of a circle centered at 45 at one end and tangentially blending into an even smaller radius arcuate segment of a circle centered at 47 at the opposite end. The radius 42 of the central circular segment 40 is several times greater than the radii 46 and 48 of either of the two circular segments of lesser radius. Arcuate segment 49 centered at 51, straight line segment 53 and arcuate segment 55 centered at 25 are part of the standard rim configuration as in FIG. 2, however, segment 55 is now less than 90 degrees.

In FIG. 7, the rim surface contour is generated as slightly less than one-half of an ellipse having a center at 59. The semi-major and semi minor axes are indicated by dotted lines 61 and 63 respectively. The ellipse blends tangentially with line 53 at one end and with circular arc segment 55 at the other. Throughout the elliptical portion of the contour, the radius of curvature monotonically increases along increasing radii of the annular rim portion. A straight line has an undefined or infinite radius of curvature, however in the present invention, the radius of curvature remains finite throughout. An elliptical central portion blending tangentially into two circular arcs similar to those shown in FIG. 6 is also possible. Other conic sections are less well suited because they lack a region of greatest radius of curvature bounded by regions of lesser radii of curvature, however, many other cross-sectional curve configurations may be envisioned. Many curves are suitable so long as the curved or crowned rim portion extends at least throughout the potential roll surface which would contact the support surface in the event of tire failure and the radius of curvature is greatest, yet finite, near the peripherally outermost portion of the flange and decreases near the extremes of the potential roll surface. This provides an enhanced contact area without introducing any flat regions in the contact area.

What is claimed is:

1. A wheel having an annular rim portion of generally U-shaped cross-sectional configuration for receiving a tire, at least one rim peripheral extremity having a convex annular surface formed in cross-section as a portion of an ellipse having a semi-minor axis extending generally radially along the annular rim portion.

2. The wheel of claim 1, wherein the at least one rim peripheral extremity comprises a potential roll surface for contacting the ground in the event of tire failure.

3. The wheel of claim 1, wherein the ellipse portion terminates near the ends of the major axis.

4. A process of manufacturing a wheel, comprising the steps of:
   forging a pair of matable wheel halves from an aluminum alloy with each half including a radially outermost peripheral rim portion;
   creating a peripheral potential roll surface on at least one peripheral rim portion for contacting the ground in the event of tire failure, and
   forming a convex contour on the roll surface with a finite cross-sectional radius of curvature at the outermost radius of the wheel to have a finite radius of curvature throughout the potential roll surface thereby providing an enhanced contact area without introducing any flat regions in the contact area.

5. A wheel having an annular rim portion of generally U-shaped cross-sectional configuration for receiving a tire, at least one rim peripheral extremity having a convex annular surface formed in cross-section as a central circular segment blending smoothly into two circular segments of lesser radii at the central circular segment extremities, the central circular segment located radially outermost on the convex annular surface providing a potential roll surface for contacting the ground in the event of tire failure.

6. The wheel of claim 5, wherein the central circular segment is tangent to each of the lesser radius segments at the central circular segment extremities.

7. The wheel of claim 5, wherein the radius of the central circular segment is several times greater than the radii of either of the two circular segments of lesser radius.

8. A wheel having an annular rim portion of generally U-shaped cross-sectional configuration for receiving a tire, at least one rim peripheral extremity comprising a potential roll surface for contacting the ground in the event of tire failure, the extremity having a convex annular surface formed in cross-section as a smooth curve having a radius of curvature which is finite throughout and monotonically increases along increasing radii of the annular rim portion.

9. The process of claim 4 wherein each roll surface radius of curvature monotonically increases along increasing radii of the annular rim portion.

10. The process of claim 4, wherein each roll surface radius of curvature is formed in cross-section as a central circular segment blending smoothly into two circular segments of lesser radii at the central circular segment extremities.

11. The process of claim 4, wherein each roll surface radius of curvature is formed in cross-section as a portion of an ellipse having a semi-minor axis extending generally radially along the respective annular rim portion.

12. The process of claim 4, wherein the greatest radii of the two peripheral rim portions differ to more evenly distribute a load between the two rim portions in the event of tire failure.

13. A process of manufacturing a wheel, comprising the steps of: creating a peripheral potential roll surface on at least one peripheral rim portion for contacting the ground in the event of tire failure, the step of creating including forming a convex contour on the roll surface with a finite cross-sectional radius of curvature at the outermost radius of the wheel, and the roll surface formed to have a finite radius of curvature throughout the potential roll surface with the roll surface radius of curvature monotonically increasing along increasing radii of the annular rim portion to provide an enhanced contact area without introducing any flat regions in the contact area.

* * * * *